(12) United States Patent
Hudin (10) Patent No.: US 11,137,900 B2
(45) Date of Patent: Oct. 5, 2021

(54) INTERFACE PROVIDING LOCALISED FRICTION MODULATION BY ACOUSTIC LUBRICATION

(71) Applicant: COMMISSARIAT A L'ENERGIE ATOMIQUE ET AUX ENERGIES ALTERNATIVES, Paris (FR)

(72) Inventor: Charles Hudin, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/498,874

(22) PCT Filed: Mar. 29, 2018

(86) PCT No.: PCT/FR2018/050781
§ 371 (c)(1),
(2) Date: Sep. 27, 2019

(87) PCT Pub. No.: WO2018/178582
PCT Pub. Date: Oct. 4, 2018

(65) Prior Publication Data
US 2020/0050356 A1  Feb. 13, 2020

(30) Foreign Application Priority Data

Mar. 31, 2017 (FR) .................................. 17 52794

(51) Int. Cl.
*G06F 3/0488* (2013.01)
*B06B 1/06* (2006.01)
(Continued)

(52) U.S. Cl.
CPC ............ *G06F 3/04883* (2013.01); *B06B 1/06* (2013.01); *G06F 3/016* (2013.01); *G06F 3/03547* (2013.01)

(58) Field of Classification Search
CPC .. G06F 3/04883; G06F 3/016; G06F 3/03547; B06B 1/06
See application file for complete search history.

(56) References Cited

U.S. PATENT DOCUMENTS 8,593,409 B1 * 11/2013 Heubel ................. G06F 3/0414
345/173
2009/0128503 A1 * 5/2009 Grant .................. G06F 3/04886
345/173
(Continued)

FOREIGN PATENT DOCUMENTS

| EP | 1 805 585 | | 7/2007 |
|---|---|---|---|
| EP | 1 956 466 | A1 | 8/2008 |
| EP | 2 682 843 | A1 | 1/2014 |

OTHER PUBLICATIONS

U.S. Appl. No. 15/770,879, filed Apr. 25, 2018, 2018/0314375 A1, Charles Hudin et al.
(Continued)

*Primary Examiner* — Muhammad N Edun
(74) *Attorney, Agent, or Firm* — Oblon, McClelland, Maier & Neustadt, L.L.P.

(57) ABSTRACT

A touch interface comprising a first surface and n actuators designed to vibrate said first surface, n being an integer >1. A control unit is able to generate a control signal for each actuator, each control signal being a harmonic signal comprising a carrier signal at a non-radiative frequency.

23 Claims, 4 Drawing Sheets

(51) Int. Cl.
*G06F 3/01* (2006.01)
*G06F 3/0354* (2013.01)

(56) References Cited

U.S. PATENT DOCUMENTS

| | | | | |
|---|---|---|---|---|
| 2009/0250267 | A1* | 10/2009 | Heubel | G06F 3/04886 178/18.03 |
| 2011/0115709 | A1* | 5/2011 | Cruz-Hernandez | G06F 3/016 345/168 |
| 2014/0062910 | A1 | 3/2014 | Yeo | |
| 2015/0009168 | A1* | 1/2015 | Levesque | H04M 19/04 345/174 |
| 2015/0070148 | A1* | 3/2015 | Cruz-Hernandez | G06F 3/167 340/407.1 |
| 2015/0169060 | A1 | 6/2015 | Hudin et al. | |
| 2015/0199024 | A1* | 7/2015 | Birnbaum | G11B 27/10 715/702 |

OTHER PUBLICATIONS

International Search Report dated Jun. 8, 2018 in PCT/FR2018/050781 filed on Mar. 29, 2018.
Preliminary French Search Report dated Nov. 6, 2017 in French Application No. 1752794 filed on Mar. 31, 2017.
Meyer, D. J. et al, "Dynamics of Ultrasonic and Electrostatic Friction Modulation for Rendering Texture on Haptic Surfaces", IEEE Haptics Symposium, 2014, pp. 63-67, XP032582631.
Ghenna, S. et al., "Preliminary design of a multi-touch ultrasonic tactile stimulator", IEEE World Haptics Conference (WHC), Northwestern University, 2015, pp. 31-36, XP033188591.
Wiertlewski, M. et al., "A High-Fidelity Surface-Haptic device for Texture Rendering on Bare Finger", International Conference on Human Haptic Sensing and Touch Enabled Computer Applications, 2014, pp. 1-8.
Vezzoli, E. et al., "Texture Rendering Strategies with a High Fidelity—Capacitive Visual-Haptic Friction Control Device", Haptics: Perception, Devices, Control, and Applications, Jul. 2016, 11 total pages.
Lei, J., "Formation of inverse Chladni patterns in liquids at microscale: roles of acoustic radiation and streaming-induced drag forces", Microfluid Nanofluid, vol. 21, 2017, 15 total pages.
Lau, E. et al., "Effect of low-magnitude, high-frequency vibration on osteogenic differentiation of rat mesenchymal stromal cells", NIH Public Access, Author Manuscript, 2011, pp. 1-14.
European Office Action dated Nov. 23, 2020, issued in European Patent Application No. 18 718 600.2.

* cited by examiner

INTERFACE PROVIDING LOCALISED FRICTION MODULATION BY ACOUSTIC LUBRICATION

TECHNICAL FIELD AND STATE OF PRIOR ART

The present invention relates to an interface providing localised friction modulation by acoustic lubrication, that can be in particular implemented in a touch interface.

A touch interface includes a surface for being explored by one or more fingers. It can be for example the surface of a screen. It is attempted to be able to render texture feelings upon exploring the surface, whereas the surface is smooth.

The texture feeling can be achieved thanks to a technique using electro-vibration which temporally increases and modulates the friction coefficient between the finger and the surface by creating an attractive electrostatic force between the finger and an electrode protected by a transparent thin layer of insulating material. By implementing an electrode array, a spatial variation in the friction and thus a multitouch exploration can be obtained. To obtain a significant effect, this approach by electro-vibration however requires to apply high voltages, for example higher than 100V to electrodes insulated from the finger by only a few microns of electrically insulating material. This technique thus raises problems of safe use and further requires, for the potential difference between the finger and the plate to be controllable, to maintain a common ground and thus an electric contact between the voltage source of the electrode and the user.

Another temporal modulation technique of the apparent friction coefficient between the finger and the surface, correlated to a finger movement, implements acoustic lubrication, which is generated by vibrating the surface at an ultrasound frequency. This vibration, with an amplitude in the order of one micron, generates an intermittent contact between the finger and the surface which results in a significant decrease in the apparent friction coefficient. By modulating this effect according to the position on the surface, the illusion of a spatial variation in the friction and thus a texture is achieved. This technique is described for example in document M. Wiertiewski, D. Leonardis, D. J. Meyer, M. A. Peshkin, and J. E. Colgate, "*A high-fidelity surface-haptic device for texture rendering on bare finger,*" *in International Conference on Human Haptic Sensing and Touch Enabled Computer Applications*, 2014, pp. 241-248, and document E. Vezzoli, T. Sednaoui, M. Amberg, F. Giraud, and B. Lemaire-Semail, "*Texture Rendering Strategies with a High Fidelity Capacitive Visual-Haptic Friction Control Device*," at the Eurohaptics 2016, London, 2016, vol. 9774.

As has been set out above, the texture feeling is achieved by a temporal modulation in the apparent friction coefficient correlated with a finger movement and not by a spatial variation in the friction. As a result, several fingers in contact with the surface are subjected to a same stimulus, and thus substantially feel the same simulated texture.

Document EP1 956 466 describes a touch interface including a surface and an array of piezoelectric actuators in contact with the surface, all the actuators receive the same signal so as to excite a fundamental mode of the plate. All the fingers feel the same texture.

Methods use amplitude and/or phase control of several fundamental modes of the plate to be able to simulate different textures for several fingers. However, no method enabled for the moment an interface able to generate a localised modulation of the friction coefficient to be made.

DISCLOSURE OF THE INVENTION

Consequently, a purpose of the present invention is to provide an interface able to locally modulate the friction coefficient, such that, for example, when the interface is implemented in a touch interface and the touch surface is explored by at least two fingers simultaneously, different apparent friction coefficients can be generated for each finger, and thus enable a different texture feeling to be simulated for each finger.

The aforementioned purpose is achieved by an interface implementing acoustic lubrication, including a surface, at least one actuator able to vibrate said surface. Said actuator is excited by a harmonic signal in which the carrier signal is at a so-called non-radiative frequency. By implementing a carrier signal at a non-radiative frequency, the vibrations generated by the actuator remain substantially confined to the zone covered by the actuator. Only evanescent vibration waves are produced beyond the zone covered by the actuator.

As a consequence, when the surface is a touch surface explored by two fingers, the finger located on the zone covered by the actuator feels a modulable apparent friction coefficient and the finger located outside this zone feels the real friction coefficient between the finger and the material of the touch surface.

In the case where several actuators are implemented, the interface is such that each actuator can be excited by a different excitation signal. The carrier signal is preferably the same for all the actuators.

In one advantageous example, the driving signal can advantageously be modulated. According to the invention, each driving signal can be separately modulated. It is thereby possible to generate an acoustic lubrication at each actuator which differs from one actuator to the other. As a result, each finger can be differently stimulated and feel a different texture.

Indeed, some frequencies, called non-radiative frequencies, have been identified, for which a very low energy propagated outside the surface of the actuator. However, generally, it is avoided to operate at these frequencies which can be identified as cut-off frequencies and the dimensions of the actuators are chosen in order to be outside these actuation frequencies. Contrary to general practice, the inventor uses these frequencies to generate a driving signal and obtains a localised acoustic lubrication, which had not been obtained yet.

By choosing one of these radiative frequencies as the frequency of the carrier signal, it is possible to reduce the apparent friction coefficient on a zone substantially confined to the surface covered by the actuator, and thus to vibrate only the zone of the touch surface covered by the actuator, By implementing several actuators, different stimulations for two fingers can be generated. Advantageously, the driving signal can be modulated, enabling the variation in the apparent friction coefficient to be temporally modulated.

By distributing actuators under the entire surface to be touch explored, it is possible to simulate localised texture feelings on the entire touch surface.

The actuators are for example thin plates of piezoelectric material glued to the surface of the plate opposite to the surface for being touch explored.

Preferably, the non-radiative frequency(ies) are chosen outside the audio frequency range so as to provide a low-level noise operation touch interface.

Consequently, one subject-matter of the invention is an interface including a first surface and at least one actuator for vibrating said surface in a direction transverse to the surface, a control unit able to generate a driving signal, said driving signal being a harmonic signal including a carrier signal at a non-radiative frequency.

In one exemplary embodiment, the interface includes n actuators for vibrating said first surface, n being an integer >1, the control unit being able to generate a driving signal for each actuator, each driving signal being a harmonic signal including a carrier signal at a non-radiative frequency.

Preferably, the carrier signal is identical for all the driving signals.

Advantageously, each non-radiative frequency is such that the amplitude of the vibrations generated by the actuator in a zone of the surface outside a zone of the surface covered by the actuator is lower than the amplitude of the vibrations generated by the actuator in the zone of the surface covered by the actuator by at least 10 dB.

In one exemplary embodiment, each non-radiative frequency is equal to or higher than 1 kHz.

According to an additional feature, the driving signal(s) include a modulation signal, having for example a modulation frequency from 1 Hertz to several hundreds of Hertz.

In one exemplary embodiment, the interface can include a plate carrying the first surface. The actuator(s) are piezoelectric actuators integral, for example through gluing, with a second surface of the plate which is opposite to the first surface, so as to vibrate the first surface.

The interface can advantageously include detection means for detecting the presence of one or more objects or one or more touch parts of a user on the first surface and/or the load exerted by the object(s) or the touch part(s) on the first surface. For example, the detection means implement the piezoelectric actuator(s) and are configured to measure a variation in the electric impedance of the piezoelectric actuator(s).

In one exemplary embodiment, the actuator(s) cover substantially the entire second surface.

The interface can be a touch interface, in which the first surface is a touch surface for being explored by one or more touch parts of a user.

The plate can be transparent and the actuators can also be transparent so as to enable a user to view a screen located under the plate.

Another subject-matter of the present invention is an object micromanipulation device including an interface according to the invention and means for generating vibrations in the plane of the surface.

Another subject-matter of the present invention is a method for rendering a texture feeling by means of a touch interface including a surface and at least one actuator able to vibrate said surface, said method including:
  the step of generating a driving signal including a harmonic signal comprising a carrier signal at a non-radiative frequency,
  the step of sending this driving signal to the actuator so as to generate a modification in a friction coefficient of a zone of the touch surface covered by the actuator.

In the case of an interface including several actuators, the method can generate several driving signals to excite several actuators separately, said driving signals each including a harmonic signal comprising a carrier signal at a non-radiative frequency and sending this driving signal to the actuator so as to generate a modification in a friction coefficient of a zone of the touch surface covered by the actuator.

All the driving signals have advantageously the same carrier signal.

At least part of the driving signals can include a modulated signal.

BRIEF DESCRIPTION OF THE DRAWINGS

The present invention will be better understood based on the description that follows and the appended drawings in which.

DETAILED DISCLOSURE OF PARTICULAR EMBODIMENTS

The description that follows describes the invention in further detail in application to touch interfaces. But the invention can have other applications which will be described below.

Figure 1:
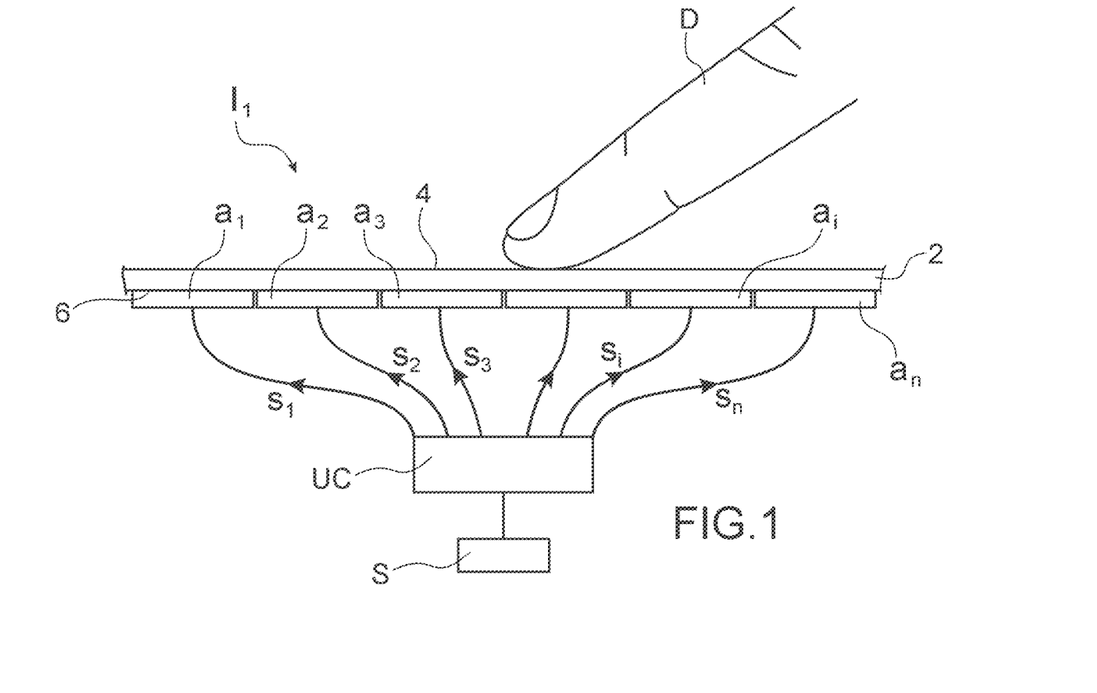
FIG. 1 is a side view schematically represented of a touch interface according to one example of the present invention.
Figure 2:
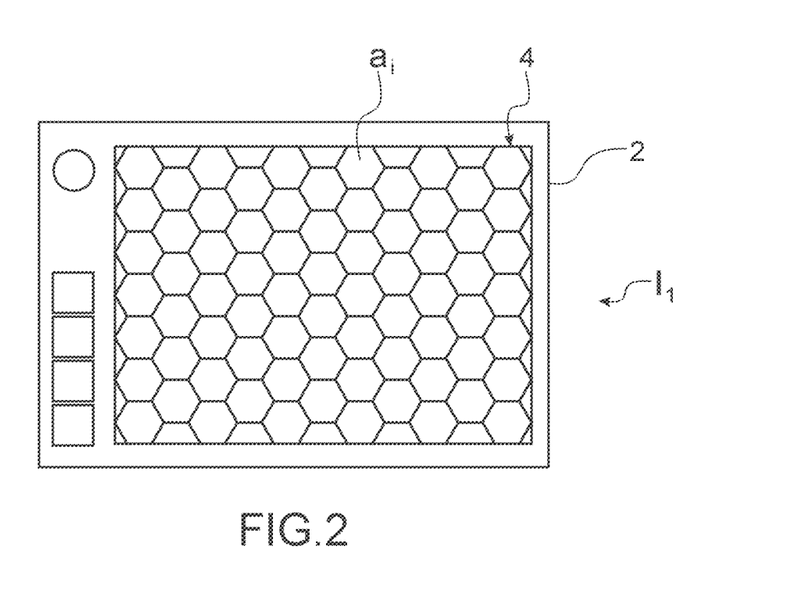
FIG. 2 is a top view of the interface of FIG. 1.

In FIGS. 1 and 2, an example of a touch interface I1 according to the invention including a plate 2 comprising a first surface 4 and a second face 6 opposite to the first face can be seen, as schematically represented.

The first surface 4 is intended to be touch explored, for example by a user's fingers. The first surface 4 is designated as the touch surface.

In the example represented, the touch surface is planar, as well as the plate but the present invention is applicable to curved touch surfaces and to curved plates. The term "plate" is not limited to a planar element but to any element providing a large length with respect to its thickness and that can be planar at least partly and/or have one or more curvatures.

In the present application, it is considered, for the sake of simplicity, that the touch surface 4 is to be touched by the pad of a finger D or several fingers. But the surface of the interface according to the invention is able to apply a stimulation to any part of the user's body which is sensitive to the sense of touch, designated the touch parts.

In the example represented, the interface includes several actuators ai, with i an integer 1≤I≤n, in contact with the second surface 6 such that, when one or more actuators are excited, they transmit vibrations to the plate 2. A touch interface with a single actuator is within the scope of the present invention.

The actuators are for example piezoelectric actuators each including a thin plate of piezoelectric ceramic, such as PZT (lead zirconate titanate) or AlN (Aluminium Nitride) attached to the second surface 6, for example by gluing or by thin film deposition. Alternatively, the actuators could be magnetostrictive.

The actuators can cover the entire second surface 6 or be disposed only at some positions on the second face 6.

The plate can be made of plastic, metal, glass, ceramic.

In the case of a touch interface, the thickness of the plate is preferably lower than 1 mm in order to reach sufficient plate displacement amplitudes by limiting energy consumption. In other applications, the thickness can be increased or decreased.

Preferably, the thickness of the plate is chosen low with respect to the dimensions of the actuator in the plane. Preferably, the length or the diameter of the actuator is equal to at least twice the plate thickness.

Preferably, the actuators have a circular shape, for example a disc shape or a ring shape. As will be explained in the following of the description, the actuators are excited at non-radiative frequencies. However, the existence of non-radiative frequencies is explained by the destructive interference of the waves produced on the entire actuator perimeter. When the actuator is circular, all the waves can cancel each other out perfectly. If the actuator has a non-circular shape, a total wave quenching can never be obtained, at a given frequency. However, there are always frequencies with a lesser radiation amplitude. Whatever the actuator shape, one or more non-radiative frequencies can be determined.

A vibration source driven by a harmonic signal produces both propagative waves and evanescent waves. Because of the actuator geometry, a destructive interference of the propagative waves is observed at some frequencies that are referred to as "non-radiating" or "non-radiative". Such non-radiating sources are described in other fields of wave physics, in particular in acoustic in electromagnetism. The inventor thought to use these waves to locally modulate the friction coefficient in a haptic interface.

Moreover, actuator shapes approaching a circular shape, such as the hexagonal shape which has the further advantage of enabling the entire surface 6 to be covered can be preferably chosen.

In the example represented, the thin plates are of hexagonal shape, which enables the entire second surface 6 to be covered while approaching a disc shape. Any other actuator shape can be contemplatable, for example a square shape.

The plate can advantageously be transparent, for example of glass, as well as the actuators to be able to be disposed on a screen.

In other applications, it can be contemplated to equip for example the rear case of a portable cell phone with actuators to form a touch interface and interact with the digital content of the phone. The touch pad of a laptop computer could also be formed by a touch interface according to the invention.

The actuators each include two electrodes (not represented), each in contact with a face of the thin plate making it possible to apply them an excitation potential difference to generate the piezoelectric effect. The electrodes are also advantageously transparent for a touch interface applied to a screen.

Each actuator is connected to a power source S. For example, at least two actuators can be driven by distinct excitation signals. All the actuators can be connected to the power source so as to be each excitable by a signal distinct from the signals applied to the other actuators. For example, a wire connection dedicated for each actuator can be contemplated.

In an operating mode, not all the actuators may be activated at the same time. A reduced number of different driving sources, for example five, can then be used, each source producing a desired stimulation. Each actuator could be connected to one of the driving sources as a function of the desired stimulation at the location of the actuator.

The touch interface also includes a control unit UC which controls the sending of the signals to each of the actuators and the signal sent to each actuator.

The control unit UC includes a module for generating driving signals for each of the actuators.

According to the invention, each actuator ai is driven by a harmonic signal $s_i$, which can be written in the following general form:

$$s_i(t)=N_i \times P(t).$$

i is an integer >1 designating the actuator to which it is intended.

P(t) is a carrier or a carrier signal with a so-called non-radiative high frequency.

In this embodiment, the carrier is identical for all the actuators and the modulation signal can be identical or different from one actuator to the other.

Each carrier can be written as:

$$P(t)=\sin(2\pi f_p t).$$

With $f_p$ is a non-radiative frequency from 1 Hz to several hundreds of kHz in the case of a touch interface, or even from one to several MHz for other applications.

$M_i$ is adapted to the actuator ai. It can be a constant. Preferentially, it is a low frequency modulation signal for the actuator i and is written $M_i(t)$.

The modulation signal Mi(t) has a spectral content in the touch sensation range, of the continuous signal at a frequency lower than 1 kHz, for example in the order of 50 Hz. Therefore, it can be a sinusoid, a square wave, etc.

In the present application, by "non-radiative frequency", it is meant an excitation frequency of an actuator for which a low part of the energy transmitted to the plate is propagated outside the zone covered by the actuator. Vibratory waves outside the zone covered by the actuator are mainly evanescent waves. For example, it is considered that the frequency of the carrier signal is a non-radiative frequency, when the displacement or vibration amplitude outside the zone covered by the actuator is lower than the displacement or vibration amplitude in the zone covered by the actuator by at least 10 dB, more advantageously lower by at least 80 dB and preferentially lower by at least 100 dB.

The zone covered by the actuator is the zone of the touch surface located flush with or vertically above the actuator and having the same dimensions as that of the actuator. In the case of a disc-shaped actuator, the zone covered by the actuator is a zone of the disc-shaped touch surface having the same diameter as the actuator and vertically above it.

The inventor has determined that there were such excitation frequencies for the actuators.

Figure 3:
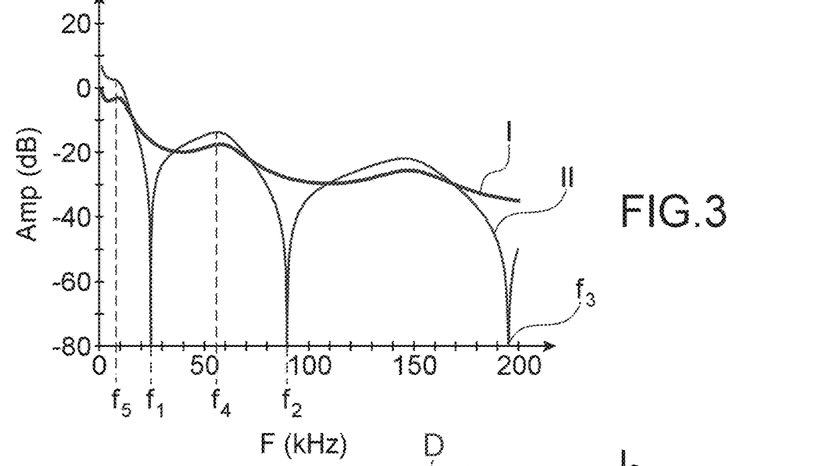
FIG. 3 is a representation of the response of a piezoelectric actuator as a function of the frequency of the excitation signal.

In FIG. 3, the variation in the amplitude Ampen in dB of the vibration in the centre of an actuator ai (curve I) and the amplitude of a propagation wave outside the actuator (curve II) as a function of the frequency F in kHz can be seen. These curves are obtained by calculation. It is observed that at some frequencies f1, f2, f3, the amplitude of the propagation wave outside the actuator is cancelled. In the example represented, f1=25 kHz, f2=90 kHz and f3=195 kHz. By choosing one of these frequencies to excite the actuator, the vibration transmitted to the plate is substantially limited to the zone covered by the actuator. These frequencies are the non-radiative frequencies.

The values of the non-radiative frequencies depend, among other things:
- on the plate and actuator thicknesses,
- on the actuator dimensions, such as its radius, its length depending on its shape,
- on the plate and the actuator elasticities (Young's modulus),
- on the plate and the actuator Poisson coefficients,
- on the plate and actuator densities.

When the actuator has a low thickness relative to that of the plate, only its length has a sensitive influence, its mechanical properties and its thickness thereby have no significant influence.

It is to be noted that the plate dimensions have no influence on the values of the radiative frequency(ies).

Thanks to the invention, it is possible to generate different friction or texture patterns for each actuator. A given texture to be reproduced can thus be assigned to each zone covered by an actuator. Thereby, it is not necessary to have means for detecting the presence of the finger(s). However, that implies a permanent actuation of all the actuators.

In another embodiment, one or more driving signals si(t) could include different carriers.

Figure 9A:
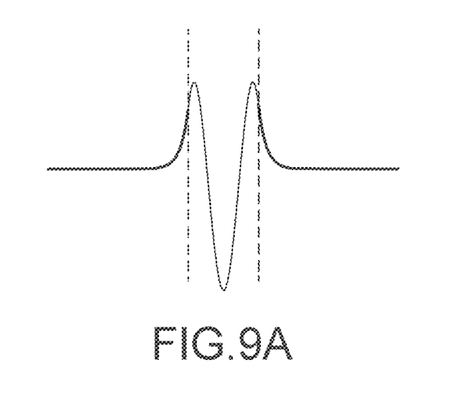
FIGS. 9A to 9D are representations of the displacements in the centre of an actuator excited by two driving signals having different carriers having respectively the frequencies f1, f2, f3, f4 of FIG. 3.
Figure 9B:
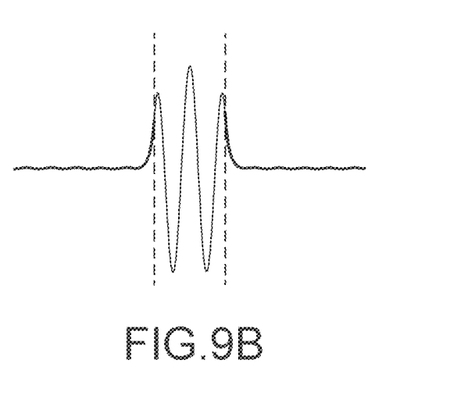

For example, on FIGS. 9A and 9B, vibration amplitude profiles can be seen in the centre of an actuator for two different non-radiative frequencies, i.e, controlled by two signals having different carrier signals. For FIG. 9A, the carrier has the non-radiative frequency f1 (FIG. 3) of about 25 kHz and for FIG. 9B, the carrier has a non-radiative frequency f2 of about 90 kHz. The actuator surface is delimited between the two vertical dotted lines. It is noticed that the displacement profile in the centre of the actuator varies with the carrier frequency. Further, it is noticed that outside the zone covered by the actuator, these are mainly evanescent waves that propagate.

Figure 9C:
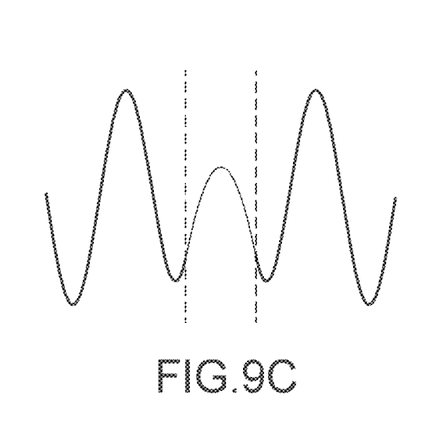
Figure 9D:
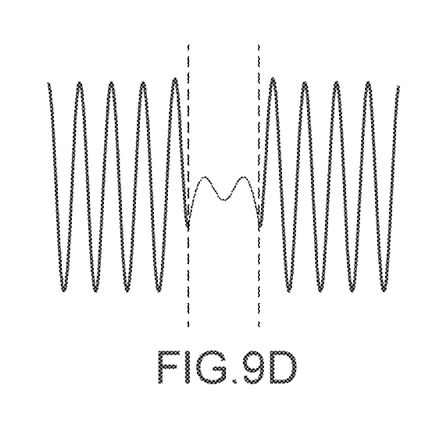

In FIGS. 9C and 9B, the amplitude profiles for the plate can be seen at the surface covered by the actuator and the surface around the actuator at radiative frequencies f5 of about 10 kHz and f4 of about 60 kHz (FIG. 3), a vibration amplitude around the actuator which is comparable, or even higher than those in the centre of the actuator is noticed.

FIGS. 9A to 9D illustrate the efficiency for localising vibrations obtained thanks to the invention by selecting carriers at non-radiative frequencies.

By choosing driving signals with different carriers, it is possible to spatially control the displacement field in the zone covered by the actuator.

In one alternative, it is contemplatable that a same driving signal includes several carriers, each at a non-radiative frequency, Thereby, the signal is a linear combination of carriers. It can be written for example in the case of two carriers as:

$$s_i(t) = M1_i \times \sin(2\pi f_{p1} t) + M2_i \times \sin(2\pi_{p2} t).$$

The displacement field in the centre of the actuator is a combination of displacement fields separately generated by each carrier.

Advantageously, the interface includes means 8 (FIG. 4A) for detecting the position of the finger(s) and/or the load exerted by the same on the surface. As a result, it is possible to modulate the stimulation as a function of the position of the fingers or loads exerted on the surface. The modulation can be activated only in zones likely to be touched, thereby resulting in a reduced energy consumption to operate the touch interface. Further, the follow-up of the finger displacement advantageously makes it possible to create the illusion of a thinner texture than the dimension of the actuator itself. If the actuator is small enough such that a single finger at maximum can be above it, the texture illusion is preserved without having to implement means for detecting the finger presence. The force measurement enables a stiffness to be simulated.

According to an exemplary embodiment, the detection of the presence of a finger can be achieved by capacitive means. The finger and the upper electrode of the actuator form both electrodes of a planar capacitor separated by an intermediate insulating plate. Further, it is possible to use these means to follow the finger displacement.

According to another example, the detection of the presence of a finger can be made by measuring a variation in the electric impedance of the piezoelectric material of the actuator. This detection is not very accurate but is sufficient to implement the present invention.

Figure 4A:
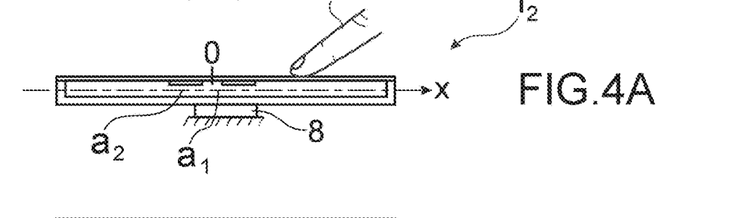
FIG. 4A is a side view schematically represented of a touch interface according to another example of the present invention including two actuators.
Figure 4B:
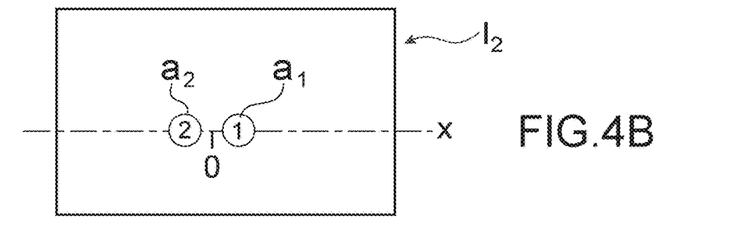
FIG. 4B is a top view of the interface of FIG. 4A.

In FIGS. 4A and 4B, side and top views of an exemplary touch interface I2 with two piezoelectric actuators a1 and a2 provided side by side can be seen.

Figure 5:
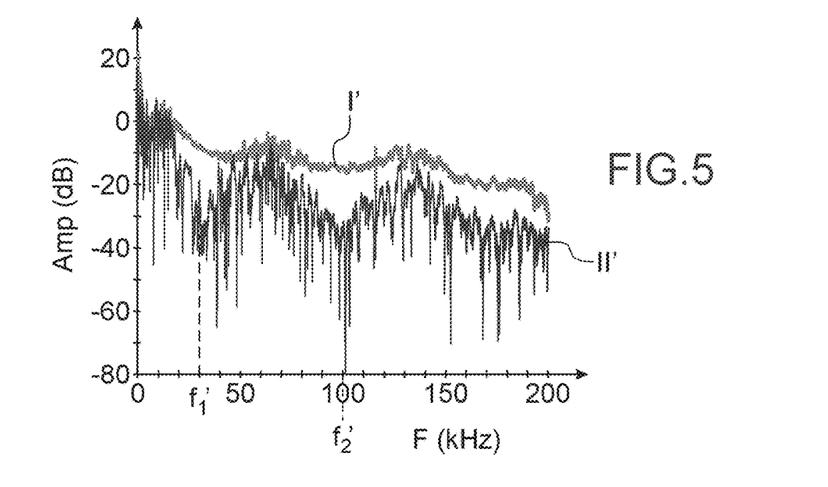
FIG. 5 is a graphic representation of the amplitude of the vibrations in nm of a surface of a touch interface according to the invention as a function of the frequency in kHz, including two actuators, upon exciting both actuators.

In FIG. 5, the measured variation of the vibration amplitude/applied voltage ratio as a function of the frequency F in kHz in the centre of the actuators (curve I') and at any point of the plate outside the zone covered by the actuator can be seen.

The existence of non-radiative frequencies f1', f2' at about 30 kHz and 100 kHz are again noticed.

By choosing a non-radiative frequency for the carrier signal, only the surface of the plate covered by the actuator is vibrated. Two actuators can thereby be excited independently of each other and generate different stimulations on the same surface.

Preferably, the non-radiative frequency which generates the highest amplitude displacement is chosen. In the present case, it is the frequency f1. It will be understood that other frequencies can be chosen depending on the applications.

Figure 6:
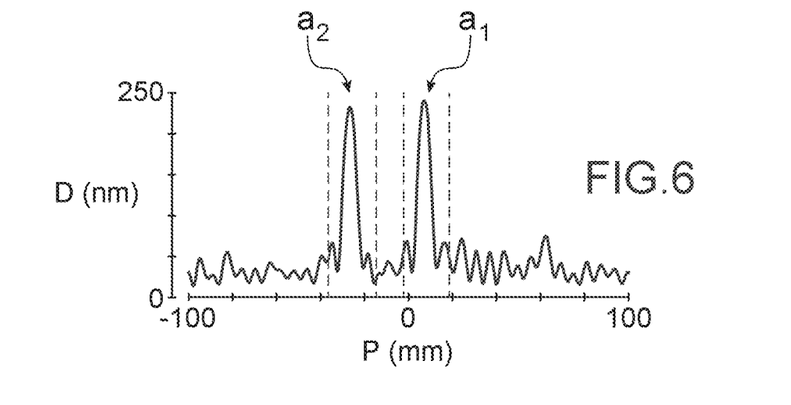
FIG. 6 is a graphic representation of the displacement measured in nm as a function of the position on the touch surface.

In FIG. 6, the measured displacement D of the plate in nm as a function of the position P on the plate in mm can be seen, when both actuators a1 and a2 are excited. The frequency of the carrier $f_p$ is equal to 33 kHz, the modulation frequency of the actuator a1 is equal to 25 Hz and the modulation frequency of the actuator a2 is equal to 100 Hz. The plate has an area of 148×200 mm$^2$ and the displacement is measured every 2 mm.

It is noticed that the displacement is substantially higher at both actuators, about 250 nm whereas the displacement is lower than 50 nm on the rest of the plate. The dotted lines delimit the axial extension of the actuators along the axis X (cf. FIGS. 4A and 4B). It is noticed that the maximum displacements for both actuators are substantially the same in spite of different modulation frequencies.

Figure 7:
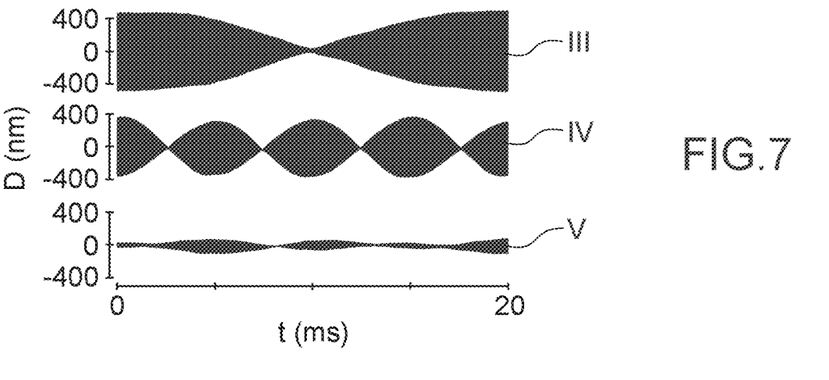
FIG. 7 shows graphic representations of the displacements in nm at the actuators a1 and a2 and in a zone of the touch surface outside the actuators a1 and a2, as a function of time in ms.

In FIG. 7, the displacement variations in nm in the centre of the actuators a1 (curve III) and a2 (curve IV) as a function of time t in ms can be seen. It is noticed that the displacement is separately modulated for both actuators, the modulation of the actuator a2 taking place at a higher frequency (100 Hz) than that of the actuator a1 (25 Hz). The curve V shows the displacement variation of the zone between both actuators, it is noticed that the displacement is modulated but its amplitude is very low in comparison with those of the displacements at the actuators a1 and a2.

Figure 8:
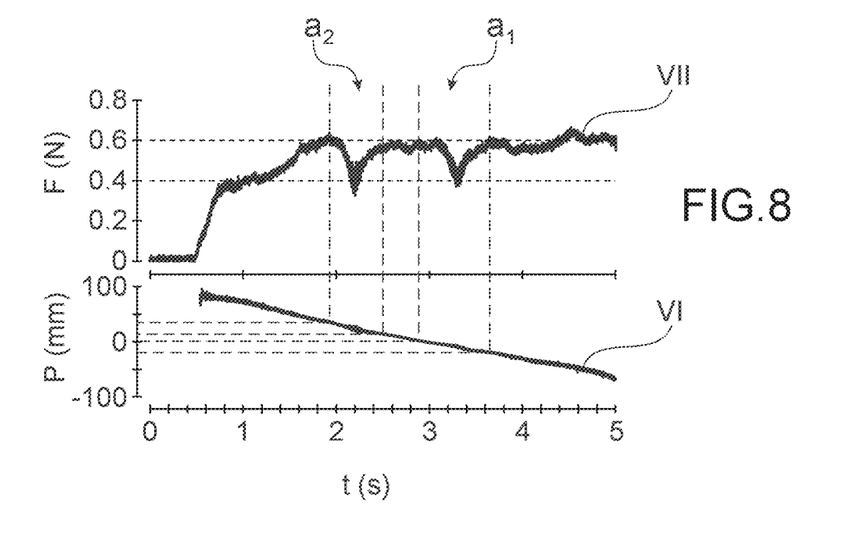
FIG. 8 shows two graphic representations, one representing the position of a finger on the touch surface as a function of time in s and the other the friction force in Newton viewed by the finger as a function of time in s.

In FIG. 8, a curve VI representing the position of a finger on the surface of the plate along the axis X in mm as a function of time in seconds can be seen. The position 0 is located in the middle of both actuators, and a curve VII representing the friction force in Newton applying to the finger. A sensitive localised decrease in the friction force on the zones covered by the actuators is noticed. The friction force ranges from 0.6N to 0.4N when the finger passes on an actuator. The actuator a1 is modulated at 25 Hz and the actuator a2 is modulated at 200 Hz.

These curves illustrate the efficiency of the invention. It is thus possible to displace in an off-plane direction at a high frequency, different zones of the surface distinctly from each other and thus to stimulate several fingers in a separate manner.

Thanks to the present invention, it is possibly to locally control the amplitude and thus the friction of a finger on a surface, unlike the interfaces of the state of the art in which the wave propagation in the plate causes a substantially uniform variation in the friction coefficient on the entire touch surface.

Those skilled in the art can determine non-radiative frequencies for a given interface, by calculation or experimentally, and establish driving signals adapted to a localised acoustic lubrication according to the invention.

Since the non-radiative frequency band extends on several kHz, a low frequency modulation, for example at a few tens of kHz in the touch sensitivity range does not disturb vibration localisation.

Any plate shape can be used as well as any actuator shape.

The plate can advantageously have a low attenuation time constant, advantageously in the order of one ms or even lower than 1 ms, which enables the vibration localisation to be further favoured by quickly damping the energy fraction propagated outside the zone covered by the actuator.

The vibration amplitude above an actuator is directly proportional to the voltage applied to the actuator, and as a result the friction reduction above an actuator is directly related to the voltage value applied thereto.

The interface according to the invention can be used in fields other than that of touch interfaces, for example it can be used in the field of the acoustophoresis-based micromanipulation.

For example, a localised off-plane vibration obtained thanks to the driving signal as described above can be coupled so as to "suspend" the object to a vibration in the plane of the plate in order to displace the object. Objects located in wanted zones of the plate can thus be displaced in the plane. It can be contemplated to displace objects from a few μm to several cm. The displaceable mass depends on the plate thickness, for example an object of about one hundred grams can be displaced by vibrations of a plate in the order of mm.

The present invention can also be applied to the manipulation of objects in a fluid, such as water or air, located above the plate, according to the technique described in document "*Formation of inverse Chiadni patterns in liquidsatmicroscaie: roles of acoustic radiation and streaming-induced drag forces*"—*MicroffluidNanofluid* (2017) 21:50

The interface according to the invention can also be implemented in the field of cell biology. Indeed, the vibrations of the support on which cells develop influence their differentiation and growth, as is described in the paper "*Effect of low-magnitude, high-frequency vibration on osteogenic differentiation of rat mesenchymal stromal cells*" *J OrthopRes.* 2011 July; 29(7): 1075-1080. Thanks to the present invention, localised vibrations can be applied to different biological tissues within a same cultivation. For example, a Petri dish can be equipped with actuators and thus develop complex biological tissues.

The invention claimed is:

1. An interface including:
   a first surface,
   at least one actuator for vibrating said first surface in a direction transverse to the first surface, and
   a control unit configured to generate a driving signal of said at least one actuator, said driving signal being a harmonic signal including a carrier signal at a non-radiative frequency,
   wherein each non-radiative frequency is such that an amplitude of the vibrations generated by the at least one actuator in a zone of the first surface outside a zone of the first surface covered by the at least one actuator is lower than an amplitude of the vibrations generated by the at least one actuator in the zone of the first surface covered by the at least one actuator by at least 10 dB.

2. The interface according to claim 1, wherein the at least one actuator comprises n actuators for vibrating said first surface, n being an integer >1, the control unit being able to generate a driving signal for each actuator, and each driving signal being a harmonic signal including a carrier signal at a non-radiative frequency.

3. The interface according to claim 2, wherein the carrier signal is identical for all the driving signals.

4. The interface according to claim 1, wherein each non-radiative frequency is equal to or higher than 1 kHz.

5. The interface according to claim 1, wherein the driving signal includes a modulation signal.

6. The interface according to claim 1, including a plate carrying the first surface and in which the at least one actuator is a piezoelectric actuator integral with a second surface of the plate which is opposite to the first surface, so as to vibrate the first surface.

7. The interface according to claim 6, wherein the at least one actuator covers substantially the entire second surface.

8. The interface according to claim 1, including at least one detector for detecting a presence of one or more objects or one or more touch parts of a user on the first surface and/or a load exerted by the one or more objects or the one or more touch parts on the first surface.

9. The interface according to claim 8, wherein the at least one detector comprises at least one piezoelectric actuator and is configured to measure a variation in an electric impedance of the at least one piezoelectric actuator.

10. The interface according to claim 1, wherein the driving signal has a modulation frequency from 1 Hertz to several hundreds of Hertz.

11. The interface according to claim 1, comprising a plate carrying the first surface and in which the at least one actuator is a piezoelectric actuator attached to a second surface of the plate which is opposite to the first surface, so as to vibrate the first surface.

12. A touch interface including an interface according to claim 1, wherein the first surface is a touch surface for being explored by one or more touch parts of a user.

13. The touch interface according to claim 12, comprising a plate carrying the first surface wherein the plate is transparent and the at least one actuator is transparent so as to enable a user to view a screen located under the plate.

14. An object micromanipulation device including an interface according to claim 1 and at least one generator for generating vibrations in a plane of the first surface.

15. The interface according to claim 1, wherein each non-radiative frequency is such that the amplitude of the vibrations generated by the at least one actuator in the zone of the first surface outside the zone of the first surface covered by the at least one actuator is lower than an amplitude of the vibrations generated by the at least one actuator in the zone of the first surface covered by the at least one actuator by 10 dB-100 dB.

16. A method for rendering a texture feeling by means of a touch interface including a surface and at least one actuator configured to vibrate said surface, said method including:
the step of generating a driving signal including a harmonic signal comprising a carrier signal at a non-radiative frequency, and
the step of sending the driving signal to the at least one actuator so as to generate a modification in a friction coefficient of a zone of a surface covered by the at least one actuator,
wherein each non-radiative frequency is such that an amplitude of vibrations generated by the at least one actuator in a zone of the surface outside the zone of the surface covered by the at least one actuator is lower than an amplitude of the vibrations generated by the at least one actuator in the zone of the surface covered by the at least one actuator by at least 10 dB.

17. The method according to claim 16, wherein the interface includes several actuators, said method comprising generating several driving signals to excite the several actuators separately, said driving signals each including a harmonic signal comprising a carrier signal at a non-radiative frequency, and sending the driving signals to the several actuators so as to generate a modification in a friction coefficient of a zone of the touch surface covered by the several actuators.

18. The method according to claim 17, wherein all of the driving signals have the same carrier signal.

19. The method according to claim 17, wherein at least part of the driving signals includes a modulated signal.

20. The method according to claim 16, wherein sending the driving signal to the at least one actuator so as to generate the modification in the friction coefficient of the zone of the surface covered by the at least one actuator comprises vibrating the surface such that evanescent waves mainly propagate in the zone of the surface outside the zone of the surface covered by the at least one actuator.

21. The method according to claim 16, wherein sending the driving signal to the at least one actuator so as to generate the modification in the friction coefficient of the zone of the surface covered by the at least one actuator comprises vibrating the surface such that vibration transmitted to the plate is substantially limited to the zone of the surface covered by the at least one actuator.

22. An interface, comprising:
a first surface,
at least one actuator for vibrating said first surface in a direction transverse to the first surface, and
a control unit configured to generate a driving signal of said at least one actuator, said driving signal being a harmonic signal including a carrier signal at a non-radiative frequency,
wherein each non-radiative frequency is such that the at least one actuator is configured to vibrate said first surface such that evanescent waves mainly propagate in a zone of the first surface outside a zone of the first surface covered by the at least one actuator.

23. An interface, comprising:
a first surface,
at least one actuator for vibrating said first surface in a direction transverse to the first surface, and
a control unit configured to generate a driving signal of said at least one actuator, said driving signal being a harmonic signal including a carrier signal at a non-radiative frequency,
wherein the at least one actuator is configured to vibrate the first surface such that vibration transmitted to the plate is substantially limited to a zone of the first surface covered by the at least one actuator.

* * * * *